No. 696,494. Patented Apr. 1, 1902.
M. R. RUBLE.
MACHINE FOR CLEANING AND RENOVATING FEATHERS.
(Application filed June 14, 1901.)
(No Model.)
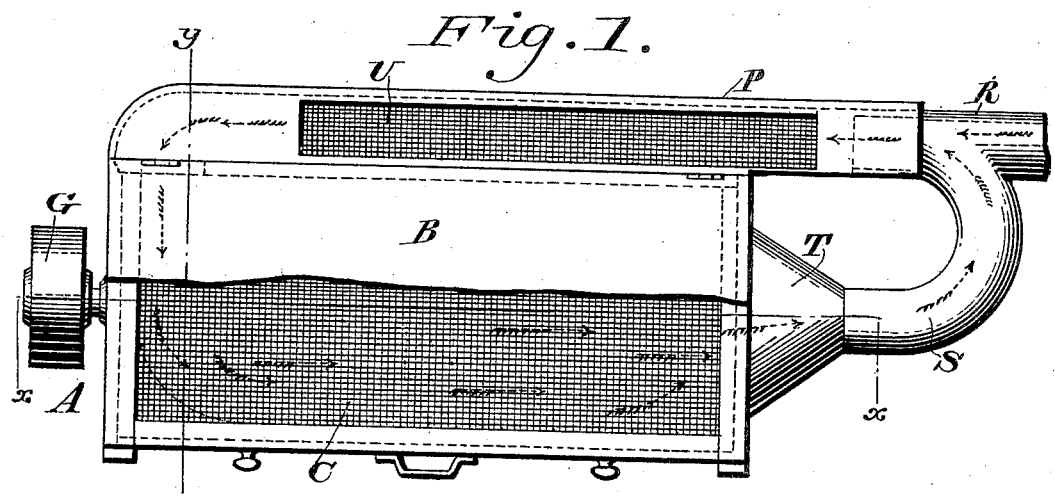
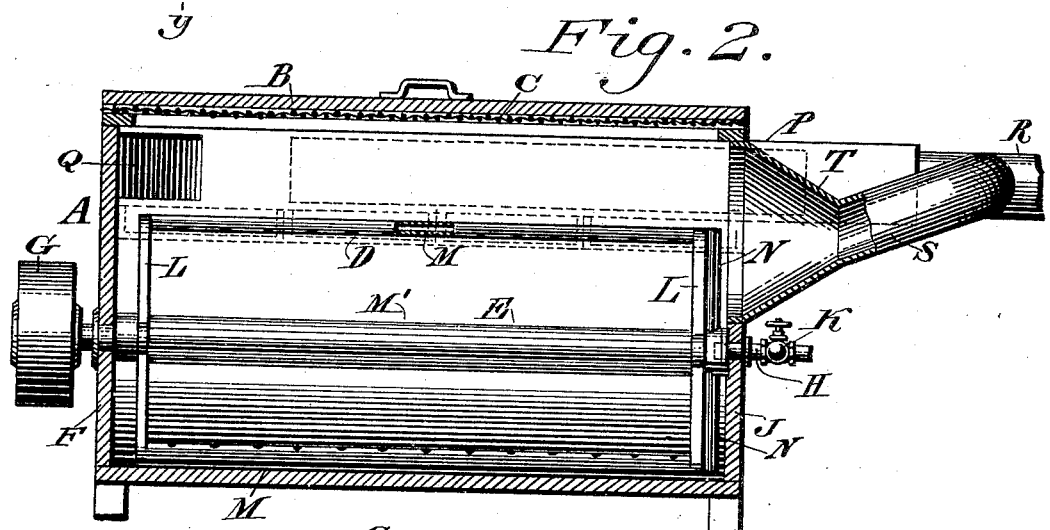
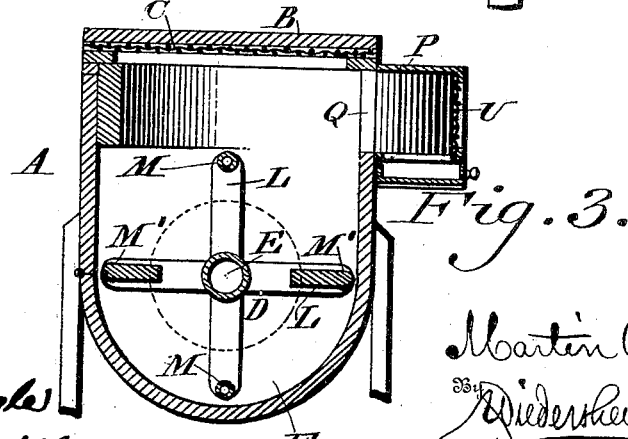

UNITED STATES PATENT OFFICE.

MARTIN ROSE RUBLE, OF PHILADELPHIA, PENNSYLVANIA.

MACHINE FOR CLEANING AND RENOVATING FEATHERS.

SPECIFICATION forming part of Letters Patent No. 696,494, dated April 1, 1902.

Application filed June 14, 1901. Serial No. 64,532. (No model.)

*To all whom it may concern:*

Be it known that I, MARTIN ROSE RUBLE, a citizen of the United States, residing in the city and county of Philadelphia, State of Pennsylvania, have invented a new and useful Improvement in Machines for Cleaning and Renovating Feathers, &c., of which the following is a specification.

My invention consists of a machine for cleansing and renovating feathers, &c., the same embodying novel mechanism for subjecting the feathers, &c., to a cleansing, purifying, or renovating agent, and also novel means for blowing the feathers in a stream through the machine, whereby they will be effectively dried and clogging of the machine is prevented.

Figure 1 represents a top or plan view of a feather cleaning or renovating machine embodying my invention. Fig. 2 represents a vertical section thereof on line $x\,x$, Fig. 1. Fig. 3 represents a transverse section on line $y\,y$, Fig. 1.

Similar letters of reference indicate corresponding parts in the figures.

Referring to the drawings, A designates a tank, which has a lid B for closing the top or inlet of the same and a cover C, of gauze or reticulated or perforated material, for preventing the escape of the feathers during steaming, as will be hereinafter more fully specified. Within the tank is the beater D, whose shaft E is hollow and is mounted at one end in the wall F of the tank A and carries the pulley G, whereby power may be communicated to said shaft for rotating the said beater. The other end of said shaft is connected by a stuffing-box or other suitable means with the steam-supply pipe H, which is stationarily mounted on the adjacent wall J of the tank A, said pipe being provided with a cock or valve K for evident purposes.

The beater is composed of the spider or reel L, the perforated pipes M, and the blades M', carried on the outer end portions thereof, and the branch pipes N, which are in communication with the hollow shaft E and said perforated pipes M, whereby steam may be admitted to the latter.

At the side of the tank A is a chute P, which opens into the same, as at Q, and is connected with a blast-pipe R. At the end wall of the tank, adjacent to said pipe R, is a gooseneck or pipe S, one end of which is connected with said pipe R as an injector and the other end is preferably enlarged as a funnel T and connected with said end of the tank and forms a communication between the tank A and the blast-pipe R.

Portions of the chute P are opened and covered by pieces U of gauze or other reticulated material.

The operation is as follows: The lid B is opened and the perforated cover C removed. The feathers are now placed in the tank and said cover is restored, after which power is applied to the beater, so that the feathers are agitated, turned, and overturned. Steam is then turned on at the pipe H, the same then discharging through the pipes M of the latter, beating and spraying the feathers, whereby the latter are thoroughly and effectively steamed and the dirt and other foreign matters loosened therefrom. The vapors escape through the perforated cover C without allowing the feathers to escape from the tank. After the steaming is accomplished the valve or cock K is closed and a blast of air admitted into the pipe R, and so injected into the tank, whereby the feathers are gradually blown from the tank into the pipe S and from thence into the pipe R, by which they are returned into the tank, when the stream of feathers continue the circuit, and so are effectively dried, there being no liability of the feathers to clog in the machine. As the feathers pass through the chute P some of the air blown or directed thereinto escapes therefrom through the gauze or pieces U and carries with it vapors and dirt from the feathers. In order to remove the dirt that may collect in said chute, I employ the drawers V, the same being in communication with said chute and serving to receive said dirt, so that when said drawers are displaced the dirt may be removed therefrom, as is evident on reference to Fig. 3.

Having thus described my invention, what I claim as new, and desire to secure by Letters Patent, is—

1. In a machine of the character stated, a tank, a spraying-beater therein, and means for supplying said beater with a cleansing or renovating agent, a blast-conveyer leading to an inlet-opening of said tank, a connection at the outlet-opening of said tank with said conveyer at the inlet end of the latter, and a blast-supply pipe, the latter and said connection having a common inlet in said blast-conveyer.

2. A machine of the character stated having a tank, a beater therein, a blast-conveyer and a feather-discharge pipe connected with opposite ends thereof, said discharge-pipe leading from said tank to said conveyer, and a blast-supply pipe, the latter and said discharge-pipe having a common inlet in said blast-conveyer, whereby feathers or other articles placed in the tank are blown in a circulating stream through the machine for drying purposes.

3. In a machine of the character stated, a tank, a blast-pipe, a chute continuous of said pipe and leading to the opposite end of said tank, and a discharge-pipe leading from said tank to said blast-pipe and connected therewith as an injector, said chute forming a common inlet for said blast and discharge pipes.

4. In a machine of the character stated, a tank, an air-blast conveyer connected with one end of said tank, a feather-discharge pipe connected with the other end of said tank, a blast-supply pipe, the latter and said discharge-pipe having a common entrance into said conveyer, and a drawer at the base of said conveyer.

MARTIN ROSE RUBLE.

Witnesses:
JOHN A. WIEDERSHEIM,
C. D. McVAY.